(12) United States Patent
Ebiko

(10) Patent No.: US 6,983,781 B2
(45) Date of Patent: Jan. 10, 2006

(54) PNEUMATIC TIRE

(75) Inventor: Masahiro Ebiko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 149 days.

(21) Appl. No.: 10/608,070

(22) Filed: Jun. 30, 2003

(65) Prior Publication Data
US 2004/0003881 A1    Jan. 8, 2004

(30) Foreign Application Priority Data
Jul. 4, 2002    (JP) ............................. 2002-196064

(51) Int. Cl.
*B60C 13/00*    (2006.01)
*B60C 13/02*    (2006.01)
(52) U.S. Cl. .................. 152/523; D12/500; D12/605
(58) Field of Classification Search ................ 152/523; D12/500, 605
See application file for complete search history.

(56) References Cited

U.S. PATENT DOCUMENTS

| | | | |
|---|---|---|---|
| 5,645,660 A | | 7/1997 | Attinello et al. |
| 5,645,661 A | | 7/1997 | Clementz et al. |
| 5,728,242 A | * | 3/1998 | Barrese et al. .............. 152/523 |
| 5,807,446 A | | 9/1998 | Ratliff, Jr. |
| D475,345 S | * | 6/2003 | Endo et al. ................ D12/605 |

FOREIGN PATENT DOCUMENTS

| | | | |
|---|---|---|---|
| JP | 09-315111 A1 | | 12/1997 |
| JP | 2001-191745 | * | 7/2001 |

OTHER PUBLICATIONS

Machine translation of Kajikawa (JP 2001-191745).*

* cited by examiner

*Primary Examiner*—Jeff H. Aftergut
*Assistant Examiner*—Justin Fischer
(74) *Attorney, Agent, or Firm*—Rader, Fishman & Grauer PLLC

(57) ABSTRACT

A pneumatic tire includes a sidewall surface with serrated portions, each of the serrated portions being formed by aligning numerous serrated concavo-convex stripes thereon, the serrated portions being spirally arranged along a circumferential direction of the tire. The concavo-convex stripes are formed by formation of concave grooves on the sidewall surface. The depth of the concave grooves is 0.3 to 2.0 mm. An interval between adjacent serrated portions is set 5 mm or more when measured along a radial direction of the tire.

14 Claims, 2 Drawing Sheets

PNEUMATIC TIRE

BACKGROUND OF THE INVENTION

The present invention relates to a pneumatic tire, and more specifically, to a pneumatic tire which allows serrated portions to be inhibited from cracking.

Conventionally, there has been proposed techniques which provide serrated portions on surfaces of sidewalls of tires to improve appearance of the tire sidewalls (e.g., Japanese Patent Laid-Open Publication Hei No. 9-315111), the serrated portions each comprising numerous finely serrated concavo-convex stripes which are aligned on the sidewall surface.

However, there is a problem that when the serrated portions as described above are spirally arranged on the sidewall surface in a wide range along the tire circumferential direction, cracking is apt to occur from the edges of the serrated concavo-convex stripes of the serrated portion.

SUMMARY OF THE INVENTION

An object of the present invention is to provide a pneumatic tire which allows crack durability to be improved by inhibiting cracking of the serrated portions when the serrated portions are spirally arranged along the tire circumferential direction.

In order to achieve the above object, a pneumatic tire according to the present invention has a sidewall surface with serrated portions, each of the serrated portions being formed by aligning numerous serrated concavo-convex stripes thereon, the serrated portions being spirally arranged along a circumferential direction of the tire, wherein the concavo-convex stripes are formed by formation of concave grooves on the sidewall surface, the concave grooves having a depth of 0.3 to 2.0 mm, and an interval between adjacent serrated portions being set 5 mm or more when measured along a radial direction of the tire.

As mentioned above, the concavo-convex stripes of the serrated portions are formed by recessing and adjacent serrated portions are spaced away 5 mm or more, thereby allowing surface distortion of the serrated portions to be less than that of the prior art tire during running of a vehicle. Accordingly, cracking can be suppressed in the serrated portions.

DETAILED DESCRIPTION OF THE PREFERRED EMBODIMENT

An Embodiment of the present invention will be described in detail below with reference to the attached drawings.

Figure 1:
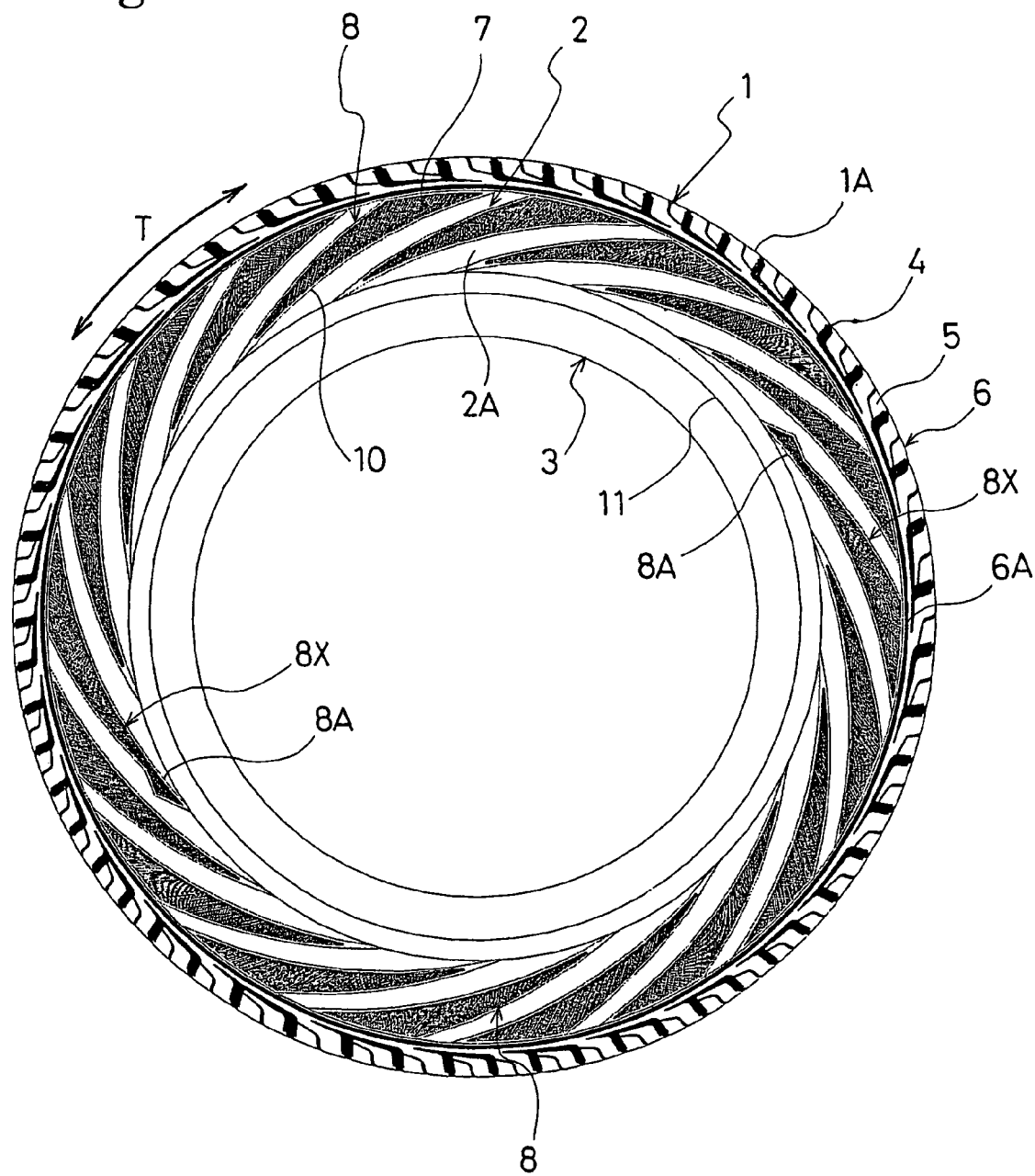
FIG. 1 is a side view illustrating an embodiment of a pneumatic tire according to the present invention.

FIG. 1 shows an embodiment of a pneumatic tire according to the present invention, in which the reference numeral 1 denotes a tread, the reference numeral 2 sidewall, and the reference numeral 3 bead.

The tread 1 includes a surface 1A (tread surface) having a tread design 6 comprising grooves 4 and blocks 5. The sidewall 2 includes a surface 2A having a plurality of serrated portions 8, each of which comprises numerous finely serrated concavo-convex stripes 7 which are aligned thereon.

The serrated portions 8 are spirally arranged at a predetermined interval along a circumferential direction T of the tire, each of the serrated portions 8 being substantially triangular in shape, gradually narrowing its width from a radially outer side of the tire toward a radially inner side thereof.

Figure 2:
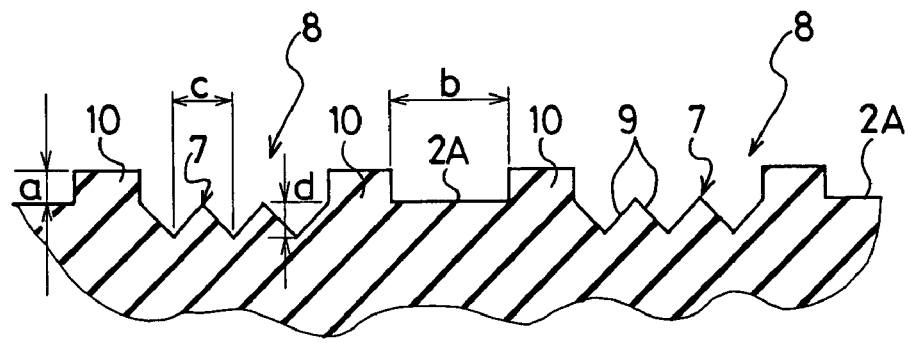
FIG. 2 is an enlarged cross-sectional view showing a serrated portion spirally arranged on a sidewall surface, the serrated portion being cut along a radial direction of the tire.

As shown in FIG. 2, the concavo-convex stripes 7 are formed by formation of cross-sectional triangular concave grooves 9 on the surface 2A of the sidewall 2 at a predetermined alignment pitch c, and are not protruded from but recessed in the surface 2A, unlike those in the conventional tires. The depth d of the concave grooves 9 is set in a range from 0.3 to 2.0 mm. Moreover, an interval b between mutually adjacent serrated portions 8 is 5 mm or more when measured along the tire radial direction.

Provided on the peripheries of the serrated portions 8 are protection protrusions 10 which project from the surface 2A of the sidewall 2. Each of the protection protrusions 10 is formed along the periphery of the serrated portion 8 so as to surround the entire concavo-convex stripes 7, whereby the concavo-convex stripes 7 can not be subject to damage.

According to the foregoing present invention, the concavo-convex stripes 7 of the serrated portions 8 are formed by recessing the surface 2A of the sidewall 2 while the interval b between mutually adjacent serrated portions 8 is defined as described above. Accordingly, when driving a vehicle, smaller distortion generated at the surfaces of the serrated portions 8 can be achieved, compared with the conventional tire. As a result, cracking is suppressed, thereby allowing crack resistance to be improved.

If the depth of the concave grooves 9 is shallower than 0.3 mm, it is not preferable in terms of appearance because a concavo-convex degree of the concavo-convex stripes 7 becomes too low. If the depth of the concave grooves 9 is deeper than 2.0 mm, rubber thickness up to tire reinforcing layers such as a carcass layer or the like located inwardly thereof is insufficient and the tire reinforcing layers are vulnerable to damage. Therefore, the rubber thickness of the sidewall is required to be greater, resulting in an increase in tire weight.

Figure 3:
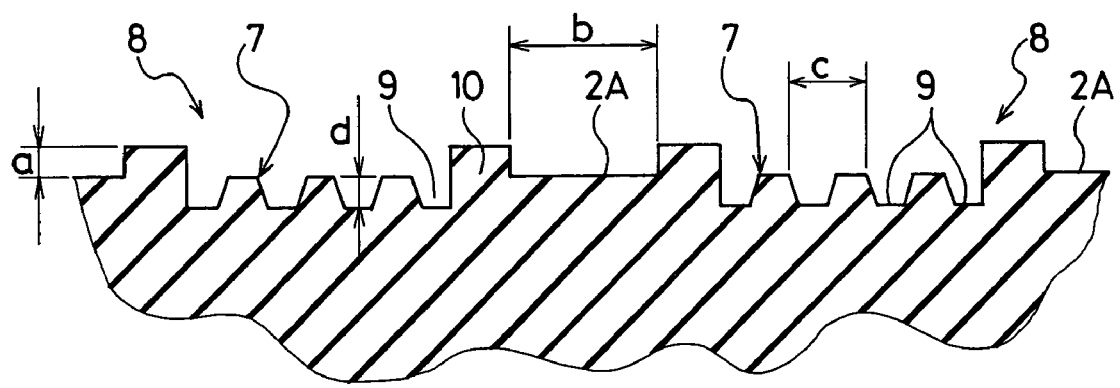
FIG. 3 is an enlarged cross-sectional view showing another serrated portion, which corresponds to FIG. 2.

FIG. 3 illustrates another example of the serrated portions 8 used in the pneumatic tire of the present invention, in which the foregoing concavo-convex stripes 7 are formed by provision of trapezoidal concave grooves 9 in cross section on the surface 2A of the sidewall 2 at a predetermined alignment pitch c. The serrated portions 8 of this kind may be employed.

In the present invention, the foregoing serrated portions 8 are arranged on the sidewall surface 2A between an end 6A of the tread design 6 and a belt-shaped rim check line 11 which is located on the side of the bead 3, circularly extends along the tire circumferential direction T and projects from the surface 2A of the sidewall 2. The serrated portions 8 are preferably arranged to occupy 30 to 70% of the area of the surface 2A therebetween. If the area occupied by the serrated portions 8 is less than 30%, it is not preferable in terms of appearance. If the serrated portions 8 occupy more than 70% of the surface area, it is difficult to improve crack resistance.

A height a of the aforementioned protection protrusions 10 may preferably be set in a range from 0.3 to 3.0 mm. If the height a is lower than 0.3 mm, an effect resistant to damage is hardly exerted on the concavo-convex stripes 7. If the height a is higher than 3.0 mm, a rigidity difference between the concavo-convex stripes 7 and the protection protrusion 10 becomes greater, whereby cracking is apt to occur on its border.

The alignment pitch c of the concavo-convex stripes 7 may preferably be set in a range from 1.0 to 5.0 mm. If the alignment pitch c is narrower than 1.0 mm, the concave grooves 9 are vulnerable to cracking. If the alignment pitch c is greater than 5.0 mm, it is not preferable in terms of appearance.

Crack Resistance

Each test tire was mounted on a rim, and an air pressure of the tire was set to 120 kPa. The test tire was attached to a drum test machine. The drum test machine was driven for 30 hours at a speed of 80 km/h and with a load of 3.94 kN as both sidewalls of the test tire were exposed to ozone. After testing of each test tire, the state of cracks produced on the both sidewalls of each test tire was visually observed, and evaluated based on the number and size of the cracks produced, making the conventional tire the index value of 100. The greater the value, the better the crack resistance was.

TABLE 1

|  | Conventional Tire | Present Invention Tire 1 | Present Invention Tire 2 | Present Invention Tire 3 | Comparative Tire | Present Invention Tire 4 | Present Invention Tire 5 |
| --- | --- | --- | --- | --- | --- | --- | --- |
| Depth a (mm) | — | 0.3 | 1 | 2 | 1 | 1 | 1 |
| Interval b (mm) | 1 | 8 | 8 | 8 | 3 | 5 | 10 |
| Crack Resistance | 100 | 110 | 108 | 105 | 100 | 105 | 108 |

When the tread design 6 has a tread pattern such that a tire rotational direction is specified in one direction, the spiral direction of the serrated portions 8 is identical to the tire rotational direction and, as shown in FIG. 1, a plurality of serrated portions 8X (two serrated portions spaced apart 180 degrees in the drawing) have an inner end 8A which is formed as a rotational direction display portion having a cuneal arrow shape, whereby the serrated portions 8 may be used to display the tire rotational direction. Thus a plurality of the rotational direction display portions are preferably provided in order to improve visibility. However, at least one serrated portion 8X may have an inner end 8A formed for the rotational direction display portion.

The present invention can preferably be employed, in particular, for pneumatic tires for passenger cars. However, the present invention is not limited to it as a matter of course.

EXAMPLE

Tires according to the present invention tires 1 to 5, comparative tire and conventional tire were produced having an equal tire size of 195/65R15, each tire according to the present invention tires 1 to 5 and comparative tire having a depth d of the concave grooves and an interval b between mutually adjacent serrated portions shown in Table 1 in a pneumatic tire illustrated in FIG. 1, the tires according to the conventional tire having serrated portions which protrude from the sidewall surface.

Each of the test tires had the serrated portions occupying 50% of the area of the sidewall surface between a rim check line and a tread design end. The alignment pitch c of the concavo-convex stripes was set at 2.0 mm for all the test tires.

The height of the protection protrusions of each of the tires according to the present invention tires and comparative tire was set at 1.5 mm.

Evaluation testing for crack resistance of the serrated portions was conducted on the test tires under the following measurement method, and their results were obtained as shown in Table 1.

It is apparent from Table 1 that the tires according to the present invention can improve crack durability.

As described above, a pneumatic tire according to the present invention has a sidewall surface with serrated portions, each of the serrated portions being formed by aligning numerous serrated concavo-convex stripes thereon, the serrated portions being spirally arranged along a circumferential direction of the tire, wherein the concavo-convex stripes are formed by formation of concave grooves on the sidewall surface, the concave grooves having a depth of 0.3 to 2.0 mm, and an interval between adjacent serrated portions being set 5 mm or more when measured along a radial direction of the tire, which allows crack durability to be improved by inhibiting cracking of the serrated portions.

What is claimed is:

1. A pneumatic tire having a sidewall surface with serrated portions, each of the serrated portions being formed by aligning numerous serrated concavo-convex stripes thereon, the serrated portions being spirally arranged along a circumferential direction of the tire,
   wherein the concavo-convex stripes are formed by formation of concave grooves on the sidewall surface, the concave grooves having a depth of 0.3 to 2.0 mm, and an interval between adjacent serrated portions being set 5 mm or more when measured along a radial direction of the tire, and
   wherein a protection protrusion projecting from the sidewall surface is provided along a periphery of each of the serrated portions.

2. A pneumatic tire according to claim 1, wherein the serrated portions occupy 30 to 70% of an area of the sidewall surface between a rim check line and a tread design end of the tire.

3. A pneumatic tire according to claim 1, wherein the height of the protection protrusion is set in a range from 0.3 to 3.0 mm.

4. A pneumatic tire according to claim 1, wherein an alignment pitch of the concavo-convex stripes is set in a range from 1.0 to 5.0 mm.

5. A pneumatic tire according to claim 1, wherein the concave grooves have a triangular shape in cross-section.

6. A pneumatic tire according to claim 1, wherein the concave grooves have a trapezoidal shape in cross-section.

7. A pneumatic tire according to claim 1, wherein the serrated portions have a substantially triangular shape with a width thereof gradually narrowing from a radially outer side of the tire toward a radially inner side thereof.

8. A pneumatic tire according to claim 7, wherein at least one serrated portion of the serrated portions has an inner end formed as a rotational direction display portion which has a cuneal arrow shape showing a rotational direction of the tire.

9. A pneumatic tire having a sidewall surface with serrated portions, each of the serrated portions being formed by aligning numerous serrated concavo-convex stripes thereon, the serrated portions being spirally arranged along a circumferential direction of the tire, wherein the concavo-convex stripes are formed by formation of concave grooves on the sidewall surface, the concave grooves having a depth of 0.3 to 2.0 mm, and an interval between adjacent serrated portions being set 5 mm or more when measured along a radial direction of the tire, and wherein the serrated portions have a substantially triangular shape with a width thereof gradually narrowing from a radially outer side of the tire toward a radially inner side thereof.

10. A pneumatic tire according to claim 9, wherein the serrated portions occupy 30 to 70% of an area of the sidewall surface between a rim check line and a tread design end of the tire.

11. A pneumatic tire according to claim 9, wherein an alignment pitch of the concavo-convex stripes is set in a range from 1.0 to 5.0 mm.

12. A pneumatic tire according to claim 9, wherein the concave grooves have a triangular shape in cross-section.

13. A pneumatic tire according to claim 9, wherein the concave grooves have a trapezoidal shape in cross-section.

14. A pneumatic tire according to claim 9, wherein at least one serrated portion of the serrated portions has an inner end formed as a rotational direction display portion which has a cuneal arrow shape showing a rotational direction of the tire.

* * * * *